(12) United States Patent
Ishibashi et al.

(10) Patent No.: US 10,541,057 B2
(45) Date of Patent: Jan. 21, 2020

(54) LIGHT WATER REACTOR FUEL ROD HAVING CERAMIC CLADDING TUBE AND CERAMIC END PLUG

(71) Applicant: Hitachi, Ltd., Chiyoda-ku, Tokyo (JP)

(72) Inventors: Ryou Ishibashi, Tokyo (JP); Yoshiyuki Takamori, Tokyo (JP); Xudong Zhang, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 343 days.

(21) Appl. No.: 15/511,663

(22) PCT Filed: Aug. 25, 2015

(86) PCT No.: PCT/JP2015/073816
§ 371 (c)(1),
(2) Date: Mar. 16, 2017

(87) PCT Pub. No.: WO2017/033276
PCT Pub. Date: Mar. 2, 2017

(65) Prior Publication Data
US 2017/0301414 A1 Oct. 19, 2017

(51) Int. Cl.
*G21C 3/10* (2006.01)
*G21C 3/07* (2006.01)

(52) U.S. Cl.
CPC ............ *G21C 3/10* (2013.01); *G21C 3/07* (2013.01)

(58) Field of Classification Search
CPC ... G21C 3/10; G21C 3/06; G21C 3/07; G21C 3/30; G21C 21/02

(Continued)

(56) References Cited

U.S. PATENT DOCUMENTS 4,642,217 A * 2/1987 Wilson ............... G21C 3/10
376/451
2006/0039524 A1 2/2006 Feinroth et al.
2014/0192949 A1 7/2014 Feinroth et al.

FOREIGN PATENT DOCUMENTS

JP 54-35585 A 3/1979
JP 54-141990 A 11/1979
(Continued)

OTHER PUBLICATIONS

Extended European Search Report issued in counterpart European Application No. 15902245.8 dated Jun. 29, 2018 (seven (7) pages).
(Continued)

*Primary Examiner* — Peter M Poon
*Assistant Examiner* — Daniel Wasil
(74) *Attorney, Agent, or Firm* — Crowell & Moring LLP

(57) ABSTRACT

A fuel rod and a fuel assembly for light water reactors, in which crack penetration to a fuel cladding tube or an end plug can be prevented, are provided. The fuel rod 10a includes: a cylindrical cladding tube 11 formed of a ceramic base material; a connection 21 formed of the same material as the cladding tube 11; and an end plug 12a having a concave portion 12f of a continuously curved surface shape adapted to house the connection 21. The end plug 12a is formed of the same material as the cladding tube 11. A slanted surface 11a formed at an end portion of the cladding tube 11, and a slanted surface 12d formed at an end portion of the end plug 12a are joined in contact with each other with a metallic joint material 20. The joint is supported by the connection 21.

18 Claims, 10 Drawing Sheets

(58) Field of Classification Search
USPC .......................................................... 376/451
See application file for complete search history.

(56) References Cited

FOREIGN PATENT DOCUMENTS

| | | |
|---|---|---|
| JP | 56-48577 A | 5/1981 |
| JP | 64-44895 A | 2/1989 |
| JP | 2012-233734 A | 11/2012 |
| WO | WO 2015/175034 A2 | 11/2015 |

OTHER PUBLICATIONS

International Search Report (PCT/ISA/210) issued in PCT Application No. PCT/JP2015/073816 dated Oct. 13, 2015 with English-language translation (four (4) pages).

Japnaese-language Written Opinion (PCT/ISA/237) issued in PCT Application No. PCT/JP2015/073816 dated Oct. 13, 2015 (three (3) pages).

* cited by examiner

[FIG. 1]
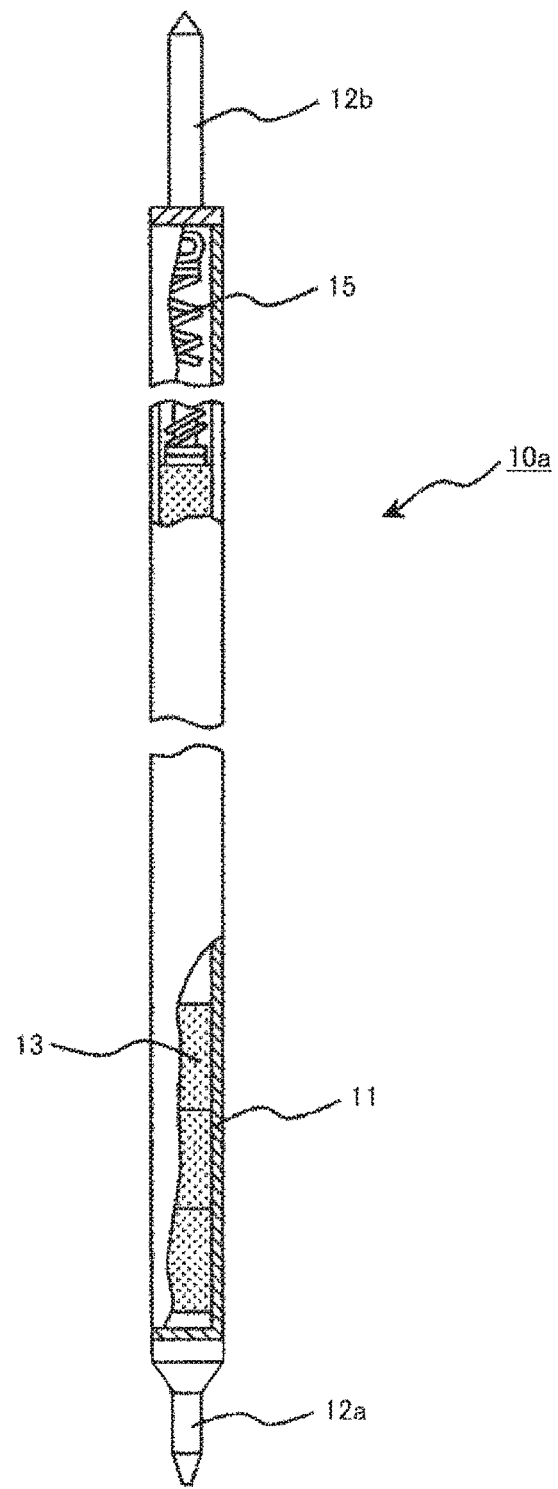

[FIG. 2]
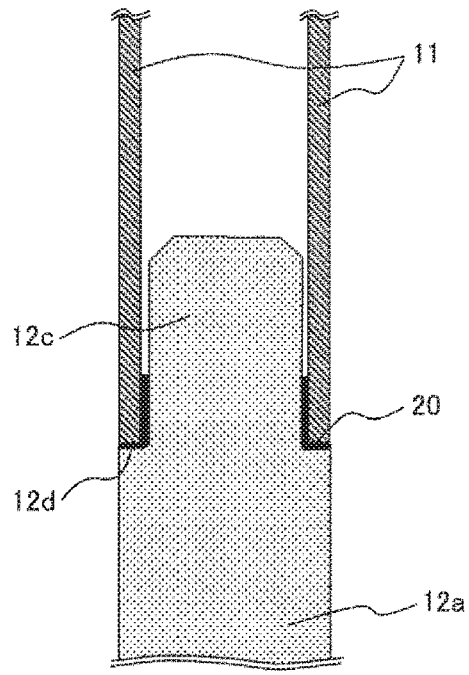
[FIG. 3]
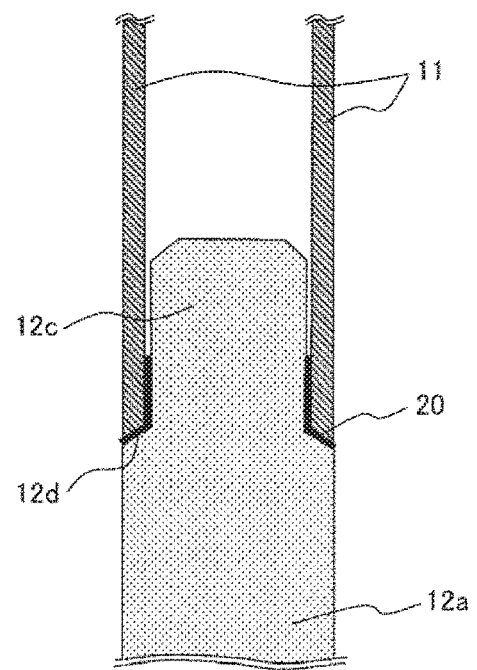

[FIG. 4]
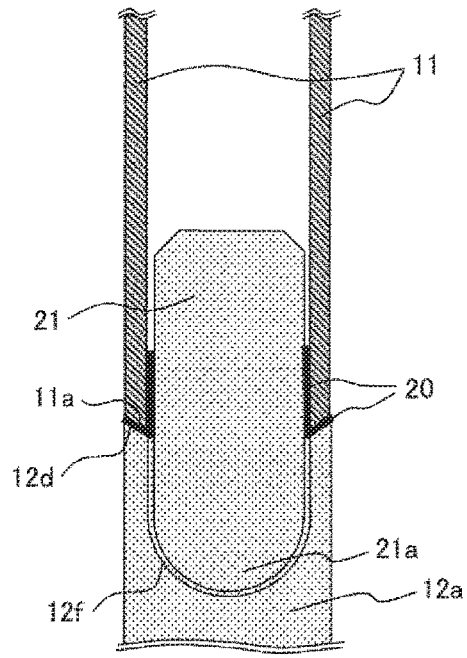
[FIG. 5]
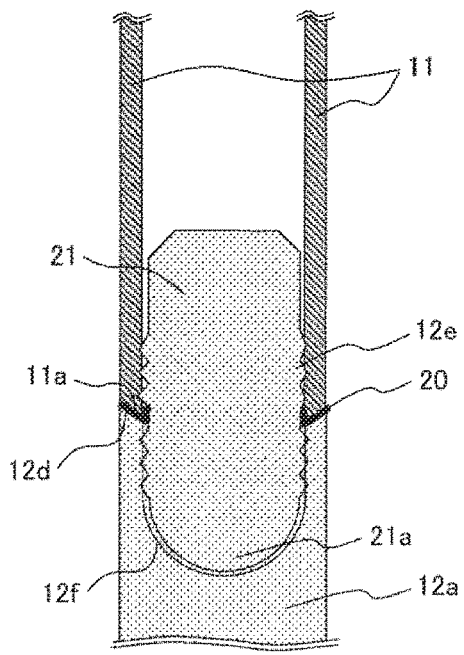

[FIG. 6]
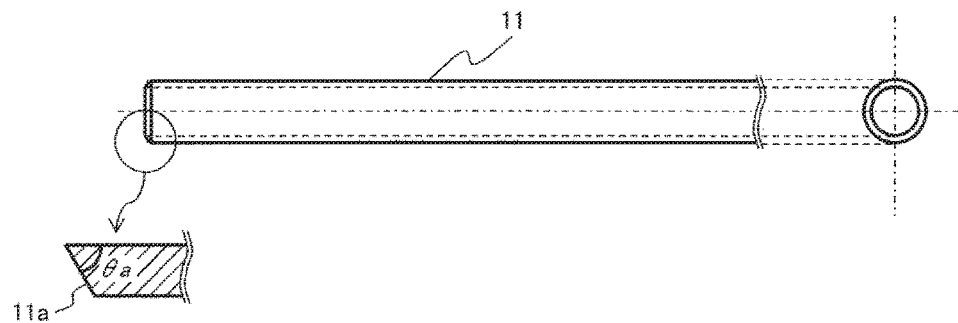
[FIG. 7]
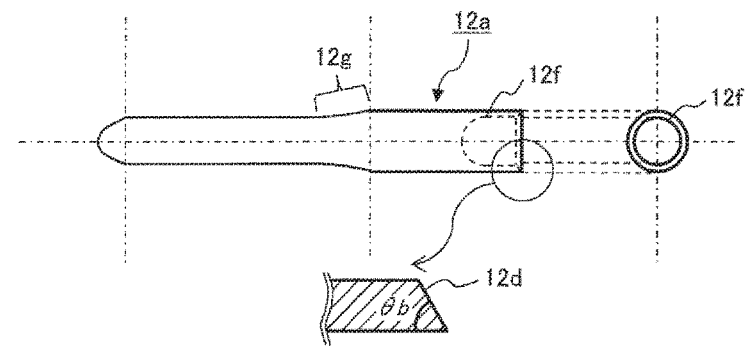
[FIG. 8]
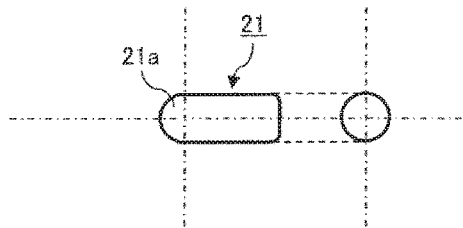

[FIG. 9]
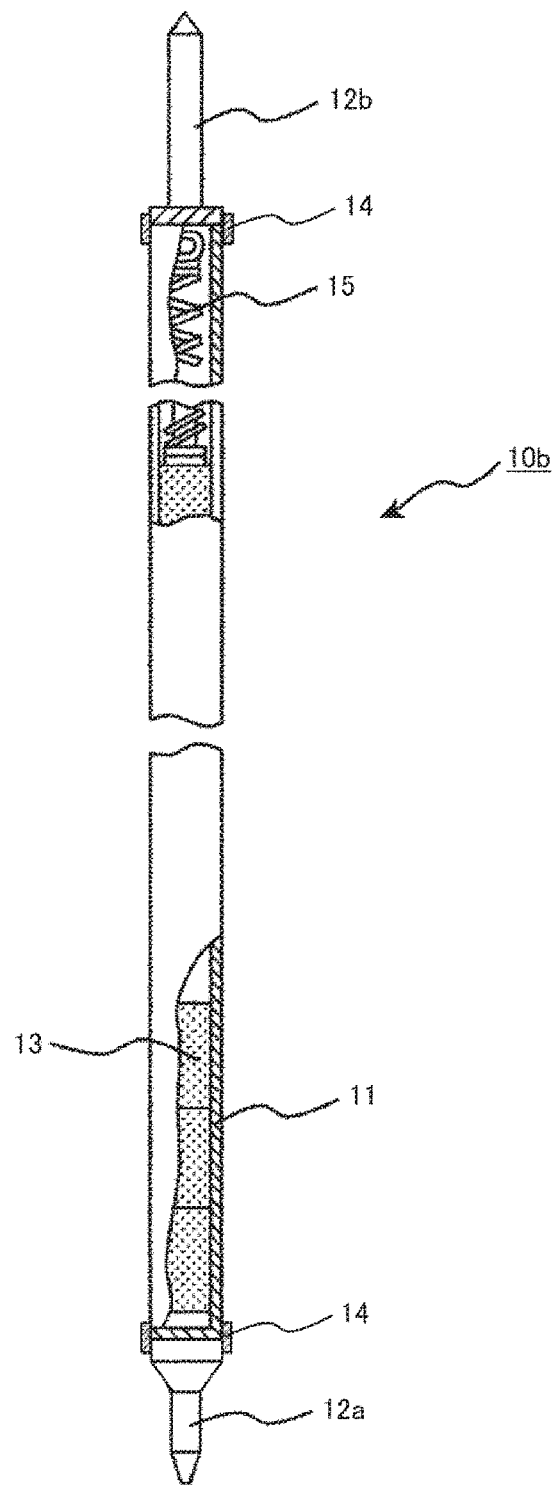

[FIG. 10]
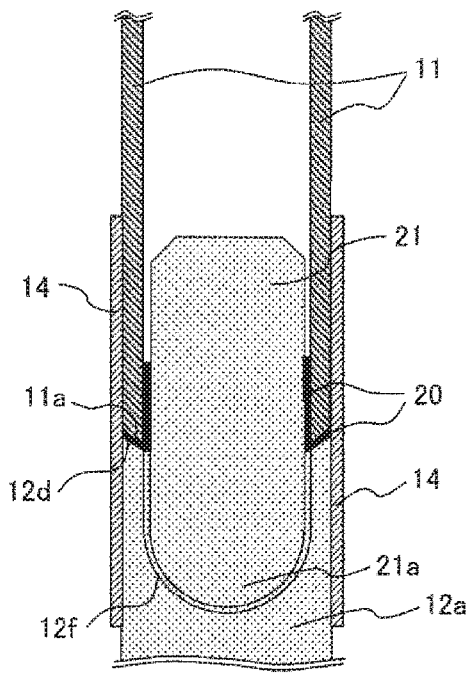
[FIG. 11]
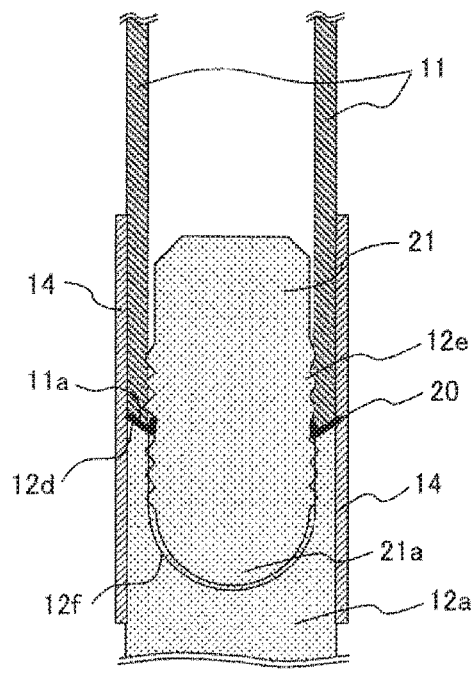

[FIG. 12]
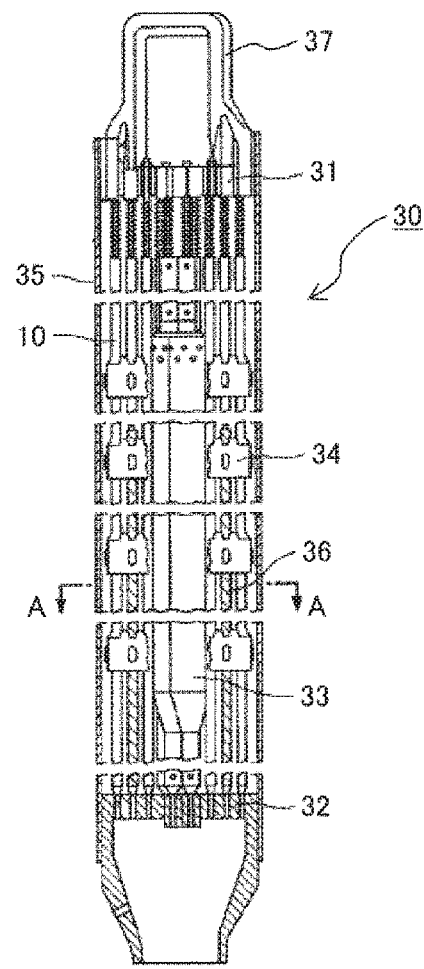
[FIG. 13]
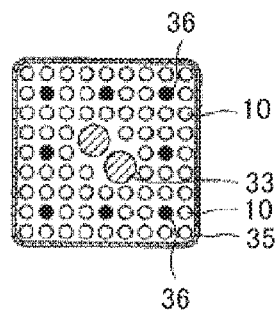

[FIG. 14]
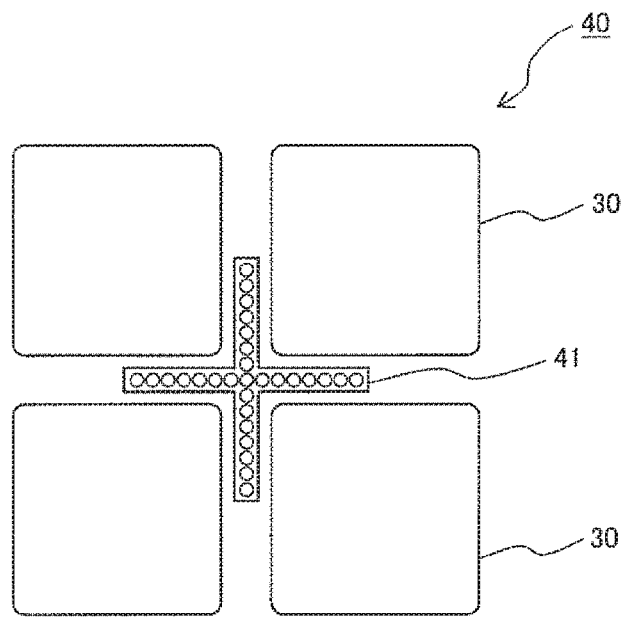

[FIG. 15]
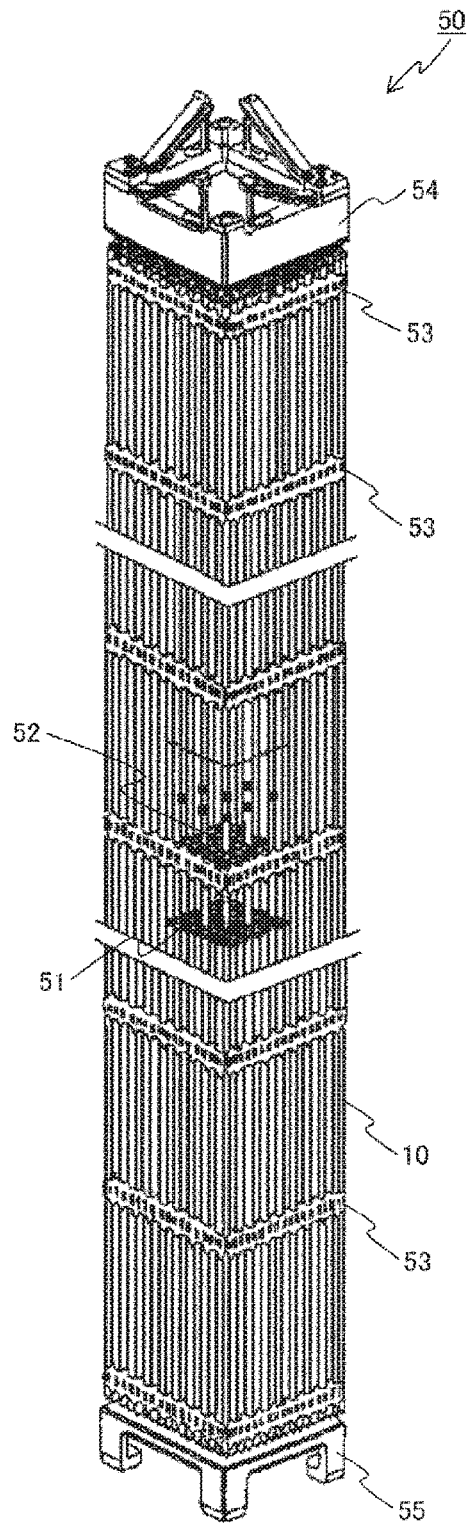

[FIG. 16]
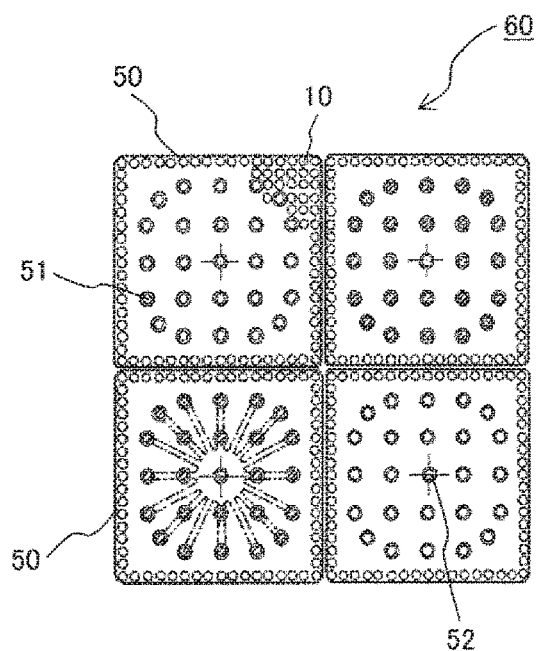

US 10,541,057 B2

LIGHT WATER REACTOR FUEL ROD HAVING CERAMIC CLADDING TUBE AND CERAMIC END PLUG

TECHNICAL FIELD

The present invention relates to a fuel assembly loaded into the reactor core of a nuclear reactor, and particularly to nuclear fuel rods and fuel assemblies loaded into the reactor core of a light water reactor.

BACKGROUND ART

Light water reactors such as boiling-water reactors (BWR) and pressurized-water reactor (PWR) typically include fuel assemblies loaded into the reactor core as nuclear fuel. The fuel assembly includes a plurality of uranium-containing nuclear fuel rods (or simply, "fuel rods") arrayed and supported with an upper tie plate and a lower tie plate.

Each nuclear fuel rod includes uranium fuel pellets charged into a fuel cladding tube about 4 meters long, and the both ends of the tube are sealed with end plugs. Traditionally, a zirconium alloy (zircalloy), which has a small thermal neutron absorption cross section and desirable corrosion resistance, has been used as material of the fuel cladding tube and the end plugs. This material has good neutron economy, and has been safely used in typical nuclear reactor environments.

In light water reactors using water as a coolant, generated heat from the uranium fuel raises the temperature inside the nuclear reactor, and a high-temperature water vapor generates in case of a loss-of-coolant accident (LOCA), a rare event where the coolant water fails to enter the nuclear reactor. In the event where the lack of the coolant (coolant water) exposes the fuel rods from coolant water, the temperature of the fuel rods well exceeds 1,000° C., and causes the zirconium alloy of the fuel cladding tube to chemically react with water vapor (the zirconium alloy is oxidized, and the water vapor is reduced) to generate hydrogen. Various safety measures are taken against a loss-of-coolant accident (LOCA), including, for example, an emergency core cooling system (ECCS). Such safety measures are not confined to system designs, but extend to the constituent materials of the reactor core.

For example, there are studies directed to using ceramic materials for fuel cladding tubes and end plugs, instead of using a zirconium alloy, which becomes a cause of hydrogen generation. Particularly, silicon carbide (SiC), which has desirable corrosion resistance, high heat thermal conductivity, and a small thermal neutron absorption cross section, has been a focus of active research and development as a promising material of fuel cladding tubes and end plugs. It is also expected that SiC greatly reduces hydrogen generation in case of a loss-of-coolant accident (LOCA), because the oxidation rate of SiC is two orders of magnitude smaller than the oxidation rate of a zirconium alloy in a high-temperature steam environment above 1,300° C.

For example, PTL 1 proposes a fuel cladding tube and end plugs configured from a SiC material. PTL 1 discloses a configuration in which a fuel cladding tube, and end plugs for sealing the both end portions of the fuel cladding tube are formed of a SiC fiber reinforced composite reinforced with silicon carbide continuous fibers, and in which the fuel cladding tube and the end plugs are directly joined to each other without interposing a dissimilar material, in at least a joint portion that comes into contact with the reactor coolant. This publication also describes a configuration in which the fuel cladding tube and the end plugs are directly joined to each other without interposing a dissimilar material on the side that comes into contact with the reactor coolant (the outer periphery surface side of the fuel cladding tube), and in which the side that does not come into contact with the reactor coolant (the inner periphery surface side of the fuel cladding tube) is joined by solid-state welding via a dissimilar material (a composite of titanium silicon carbide and titanium silicide, or silicon carbide containing aluminum and yttrium).

CITATION LIST

Patent Literature

PTL 1: JP-A-2012-233734

SUMMARY OF INVENTION

Technical Problem

In normal operation, a nuclear reactor undergoes repeated starts and stops in its operation cycle. This causes fluctuations in the internal-external pressure difference across the fuel rods, and places multiple loads on the joint between the fuel cladding tube and the end plugs. This may lead to crack initiation and propagation.

In the event of a possible earthquake or falling accident, the fuel rods are expected to receive a larger bending load than during normal operation. The end-plug joints of a fuel rod where the solid end plugs and the hollow fuel cladding tube are connected to each other are regions that undergo abrupt changes in cross sectional area. Accordingly, an applied bending load on the fuel rod with the fixed end plugs translates into a concentrated stress at the end-plug joints. The end-plug joints of a traditional zirconium alloy fuel rod undergo plastic deformation under an applied stress that exceeds the proof strength, and cracks do not penetrate through the fuel rod until the applied stress reaches a stress at rupture. However, the end-plug joints connecting the fuel cladding tube and the end plugs using a ceramic base material do not undergo plastic deformation, and a crack propagates once it generates. The crack has a high probability of penetrating through the fuel rod.

In the event where stress concentrates at the end-plug joint, and cracking occurs at the interface between the fuel cladding tube and the joint material interposed at the joint surfaces (end-plug joints) of the end plugs, the configuration of PTL 1 has the risk of a crack propagating toward the outer periphery surface of the fuel cladding tube or the end plugs along the joint surface, and penetrating into the fuel cladding tube or the end plugs.

It is accordingly an object of the present invention to provide a fuel rod and a fuel assembly for light water reactors in which crack penetration to a fuel cladding tube or end plugs can be prevented even when cracking occurs at the joint between the fuel cladding tube and the end plugs for which a ceramic base material is used.

Solution to Problem

As a solution to the foregoing problems, a fuel rod for light water reactors of the present invention includes:

a cylindrical cladding tube formed of a ceramic base material;

a connection formed of the same or similar material to the cladding tube; and an end plug having a concave portion of a continuously curved surface shape adapted to house the connection, wherein the end plug is formed of the same or similar material to the cladding tube, wherein a slanted surface formed at an end portion of the cladding tube, and a slanted surface formed at an end portion of the end plug are joined in contact with each other with a metallic joint material, and wherein the joint is supported by the connection.

A fuel assembly according to the present invention is a fuel assembly that includes a plurality of fuel rods bundled with a spacer, and that is to be loaded into a reactor core of a nuclear reactor, wherein the fuel rods include:

a cylindrical cladding tube formed of a ceramic base material;

a connection formed of the same or similar material to the cladding tube; and an end plug having a concave portion of a continuously curved surface shape adapted to house the connection, the end plug being formed of the same or similar material to the cladding tube, a slanted surface formed at an end portion of the cladding tube, and a slanted surface formed at an end portion of the end plug being joined in contact with each other with a metallic joint material, and the joint being supported by the connection.

Advantageous Effects of Invention

The present invention can provide a fuel rod and a fuel assembly for light water reactors in which crack penetration to a fuel cladding tube or end plugs can be prevented even when cracking occurs at the joint between the fuel cladding tube and the end plugs for which a ceramic base material is used.

Other objects, configurations, and advantages will be apparent from the descriptions of the embodiments below.

BRIEF DESCRIPTION OF DRAWINGS

FIG. 1 is a partial schematic cross sectional view of a nuclear fuel rod according to an embodiment of the present invention.

FIG. 2 is an enlarged schematic cross sectional view representing an example of the joint between the fuel cladding tube and the end plug of a comparative example.

FIG. 3 is an enlarged schematic cross sectional view representing another example of the joint between the fuel cladding tube and the end plug of the comparative example.

FIG. 4 is an enlarged schematic cross sectional view representing an example of the joint between the fuel cladding tube and the lower end-plug shown in FIG. 1.

FIG. 5 is an enlarged schematic cross sectional view representing another example of the joint between the fuel cladding tube and the lower end-plug shown in FIG. 1.

FIG. 6 shows a side view and an elevational view of the fuel cladding tube shown in FIG. 1, and an enlarged cross sectional view of the joint shape of the fuel cladding tube.

FIG. 7 shows a side view and an elevational view of the lower end-plug shown in FIG. 1, and an enlarged cross sectional view of the joint shape of the lower end-plug.

FIG. 8 shows a side view and an elevational view of the connection disposed in a joint region inside the fuel cladding tube and the lower end-plug shown in FIGS. 6 and 7.

FIG. 9 is a partial schematic cross sectional view of a nuclear fuel rod according to another embodiment of the present invention.

FIG. 10 is an enlarged schematic cross sectional view representing an example of the joint between the fuel cladding tube and the lower end-plug shown in FIG. 9.

FIG. 11 is an enlarged schematic cross sectional view representing another example of the joint between the fuel cladding tube and the lower end-plug shown in FIG. 9.

FIG. 12 is a schematic longitudinal sectional view of a fuel assembly according to an embodiment of the present invention.

FIG. 13 is a cross sectional view of the fuel assembly of FIG. 12 at A-A.

FIG. 14 is a schematic transverse sectional view representing an example of a boiling-water reactor cell.

FIG. 15 is a partially transparent external perspective view of a fuel assembly loaded into a pressurized-water reactor.

FIG. 16 is a schematic transverse sectional view representing an example of a pressurized-water reactor cell.

DESCRIPTION OF EMBODIMENTS

The following specifically describes embodiments of the present invention with reference to the accompanying drawings. The same reference numerals may be used to refer to the same members or parts, and descriptions of such members or parts may be omitted to avoid redundancy. The present invention is not limited to the embodiments described below, and various combinations and modifications may be appropriately made without departing from the technical idea of the present invention. Such appropriate combinations or modifications of configurations are intended to also fall within the scope of the present invention.

Nuclear Fuel Rod

FIG. 1 is a partial schematic cross sectional view of a nuclear fuel rod according to an embodiment of the present invention. A nuclear fuel rod 10a according to the present embodiment includes a fuel cladding tube 11, and a lower end-plug 12a and an upper end-plug 12b joined to the ends of the fuel cladding tube 11 to seal the fuel cladding tube 11. The fuel cladding tube 11 is charged with a plurality of fuel pellets 13. The nuclear fuel rod 10a is provided with a retainer spring 15 to retain the fuel pellets 13 charged inside the cylindrical fuel cladding tube 11. The upper end portion of the retainer spring 15 is connected to the upper end-plug 12b, and the lower end portion of the retainer spring 15 presses the fuel pellets 13. The fuel cladding tube 11, the upper end-plug 12a, and the lower end-plug 12b are configured from a ceramic base material. The following descriptions will be given through the case where these components are configured from a silicon carbide (SiC) material.

FIG. 2 is an enlarged schematic cross sectional view representing an example of the joint between the fuel cladding tube and the end plug of a comparative example. The joint illustrated in FIG. 2 is the joint between the fuel cladding tube 11 and the lower end-plug 12a. However, the structure is the same for the joint between the upper end-plug 12b and the fuel cladding tube 11. In FIG. 2, the fuel pellets 13 charged inside the fuel cladding tube 11 are omitted to more clearly illustrate the joint between the fuel cladding tube 11 and the lower end-plug 12a. As illustrated in FIG. 2, the lower end-plug 12a is a solid columnar member with a straight barrel insert 12c projecting into the fuel cladding tube 11 in a region other than the outer edge portion. The outer diameter of the straight barrel insert 12c is slightly smaller than the inner diameter of the fuel cladding tube 11, and the lower end-plug 12a has an outer diameter about the same as the outer diameter of the fuel cladding tube 11. This forms a circular step, having a flat top surface and extending substantially perpendicular to the axial direction of the fuel cladding tube 11, between the straight barrel insert 12c and the periphery of the base of the straight barrel insert 12c (outer edge portion) in the lower end-plug 12a. The circular step with a flat top surface faces the lower end surface of the fuel cladding tube 11, and represents a butt joint interface 12d that is joined to the lower end surface of the fuel cladding tube 11 via a metallic joint material 20.

In the configuration of the comparative example represented in FIG. 2, repeated starts and stops in a normal operation cycle of a nuclear reactor creates a pressure difference across the hollow cylindrical fuel cladding tube 11 charged with the fuel pellets 13 (not illustrated). Specifically, an internal-external pressure difference is created. A repeated stress due to such an internal-external pressure difference concentrates in the vicinity of the metallic joint material 20 having an interface with a dissimilar material, and may cause fatigue-induced crack initiation and propagation. In the event where an earthquake or a fall exerts a bending load on the nuclear fuel rod, a stress concentrates in the vicinity of the metallic joint material 20 lying at the base of the straight barrel insert 12c where abrupt changes occur in the transverse sectional area, and, with the lower end-plug 12a acting as a fixed end, a crack may occur and propagate when there is a large gap between the outer periphery surface of the straight barrel insert 12c and the inner periphery surface of the fuel cladding tube 11.

A repeated stress during normal operation often acts to push the hollow cylindrical fuel cladding tube 11 outward. In other words, a repeated stress pushes the hollow cylindrical fuel cladding tube 11 in a direction that increases the inner diameter and the outer diameter of the fuel cladding tube 11. Here, the displacement of the fuel cladding tube 11 becomes greater toward the upper side of FIG. 2, from the butt joint interface 12d of the lower end-plug 12a, specifically from the base of the straight barrel insert 12c. Accordingly, cracking due to a repeated stress is believed to occur most frequently in the vicinity of the uppermost part of the metallic joint material 20 that is in contact with the outer periphery surface of the straight barrel insert 12c in the gap between the inner periphery surface of the fuel cladding tube 11 and the straight barrel insert 12c. A crack generated at the uppermost part of the interface between the metallic joint material 20 and the straight barrel insert 12c propagates downwardly toward the base of the straight barrel insert 12c along the outer periphery surface of the straight barrel insert 12c. Upon reaching the base of the straight barrel insert 12c, the crack radially propagates at the interface between the butt joint interface 12d of the lower end-plug 12a and the metallic joint material 20 toward the outer periphery portion of the circular butt joint interface 12d, before possibly penetrating through the nuclear fuel rod.

FIG. 3 is an enlarged schematic cross sectional view representing another example of the joint between the fuel cladding tube and the end plugs of the comparative example. The difference from the comparative example represented in FIG. 2 is that the butt joint interface 12d of the lower end-plug 12a in FIG. 3 is slanted with respect to the axial direction of the fuel cladding tube 11. Specifically, the butt joint interface 12d of the lower end-plug 12a has a slanted surface so that the diameter of the lower end-plug 12a constituting the butt joint interface 12d increases toward the lower side of FIG. 3 from the base of the straight barrel insert 12c. The fuel cladding tube 11 has lower end surface of a shape that conforms to the butt joint interface 12d of the lower end-plug 12a. Specifically, the lower end surface of the fuel cladding tube 11 is slanted so that the inner diameter of the fuel cladding tube 11 increases toward the lower end-plug 12a. In the structure of the comparative example represented in FIG. 3, a repeated stress pushes the hollow cylindrical fuel cladding tube 11 outward, as with the case of FIG. 2. A crack generated at the interface between the straight barrel insert 12c and the metallic joint material 20 is more likely to propagate along the outer periphery surface of the straight barrel insert 12c, and the interface between the butt joint interface 12d of the lower end-plug 12a and the metallic joint material 20, and penetrate through the nuclear fuel rod than in the configuration of FIG. 2.

FIG. 4 is an enlarged schematic cross sectional view representing an example of the joint between the fuel cladding tube 11 and the lower end-plug 12a constituting the nuclear fuel rod 10a according to the embodiment of the present invention shown in FIG. 1. The joint illustrated in FIG. 4 is the joint between the fuel cladding tube 11 and the lower end-plug 12a. However, the structure is the same for the joint between the upper end-plug 12b and the fuel cladding tube 11 shown in FIG. 1. In FIG. 4, the fuel pellets 13 charged inside the hollow cylindrical fuel cladding tube 11 are omitted to more clearly illustrate the joint between the fuel cladding tube 11 and the lower end-plug 12a.

As illustrated in FIG. 4, the lower end-plug 12a is a solid columnar member with a concave portion 12f of a curved surface shape provided at an upper region including the butt joint interface 12d to be joined to the lower end surface of the fuel cladding tube 11. The concave portion 12f of a curved surface shape is a portion with a depression approximated to a portion of a spherical surface in the vicinity of the bottom portion, and a cylindrical portion having an inner surface that is continuous to the depression. The upper end surface of the lower end-plug 12a defining the concave portion 12f of a curved surface shape represents the butt joint interface 12d that can be brought into contact with the butt joint interface 11a (described later) representing the lower end surface of the fuel cladding tube 11. As illustrated in FIG. 4, the butt joint interface 12d of the lower end-plug 12a has a surface that is slanted upward from the inner periphery surface side to the outer periphery surface side (toward the fuel cladding tube 11). Specifically, the butt joint interface 12d of the lower end-plug 12a has such a shape that the inner diameter of the concave portion 12f of a curved surface shape becomes larger toward the fuel cladding tube 11. In other words, the butt joint interface 12d, which appears circular as viewed from the top, has a shape similar to the shape of an inverted hollow circular cone that becomes taller from the inner diameter to the outer diameter side.

The butt joint interface 11a representing the lower end surface of the fuel cladding tube 11 facing the butt joint interface 12d of the lower end-plug 12a is a surface that is slanted upward from the inner periphery surface side to the outer periphery surface side of the fuel cladding tube 11. In other words, the butt joint interface 11a of the fuel cladding tube 11 has a surface that is slanted toward the lower end-plug 12a from the outer periphery surface side to the inner periphery surface side of the fuel cladding tube 11. As illustrated in FIG. 4, the nuclear fuel rod 10a also has a connection 21 that is disposed in a region extending from the concave portion 12f of a curved surface shape of the lower end-plug 12a to a predetermined height inside the fuel cladding tube 11 past the butt joint interface 12d of the lower end-plug 12a and the butt joint interface 11a of the fuel cladding tube 11. The connection 21 has a solid columnar portion, and a curved surface portion 21a approximated to a portion of a spherical surface, and provided at one end or both ends of the connection 21 relative to the lengthwise direction. The columnar portion and the curved surface portion 21a have outer surfaces that are continuous to each other. In the example represented in FIG. 4, the connection 21 having the curved surface portion 21a approximated to a portion of a spherical surface is shown opposite the depression of the concave portion 12f of a curved surface shape of the lower end-plug 12a. The connection 21 supports the fuel cladding tube 11 and the lower end-plug 12a. Preferably, the curved surface portion 21a of the connection 21 approximated to a portion of a spherical surface, and the depression of the concave portion 12f of a curved surface shape of the lower end-plug 12a should have as large a curvature as possible, or should be approximated to a sphere having as large a radius as possible.

As illustrated in FIG. 4, the inner periphery surface of the fuel cladding tube 11, and the outer periphery surface of the connection 21 are joined to each other with the metallic joint material 20 in a region including the butt joint interface 12d of the lower end-plug 12a and the butt joint interface 11a of the fuel cladding tube 11, and covering a predetermined distance above the end portion of the butt joint interface 12d opposite the connection 21. The metallic joint material 20 may flow into the gap formed between the outer periphery surface of the connection 21 and the inner periphery surface of the concave portion 12f of a curved surface shape of the lower end-plug 12a, or may be applied beforehand to the outer periphery surface of the connection 21, or to the concave portion 12f of a curved surface shape of the lower end-plug 12a, and the gap may be closed with the metallic joint material 20 at the time of joining.

With the structure shown in FIG. 4 in which the fuel cladding tube 11 and the lower end-plug 12a according to the embodiment of the present invention are joined to each other with the metallic joint material 20 with the support of the connection 21, a crack occurring at the interface between the outer periphery surface of the connection 21 and the metallic joint material 20 under a repeated stress can be prevented from penetrating and propagating to the nuclear fuel rod 10a.

The following describes the mechanism by which crack penetration and propagation is prevented.

In the structure of the comparative examples represented in FIGS. 2 and 3, the base of the straight barrel insert 12c constituting the lower end-plug 12a (a region in the vicinity of the joint between the fuel cladding tube 11 and the lower end-plug 12a) is a region where the transverse sectional area of the solid lower end-plug 12a undergoes abrupt changes. In contrast, in the structure shown in FIG. 4, abrupt changes in the transverse sectional area of the solid lower end-plug 12a take place at the depression approximated to a portion of a spherical surface in the concave portion 12f of a curved surface shape of the lower end-plug 12a. Accordingly, a stress due to applied bending load concentrates in the vicinity of the depression of the concave portion 12f of a curved surface shape, distant away from the butt joint interface 11a of the cladding tube 11 and the butt joint interface 12d of the lower end-plug 12a where the fuel cladding tube 11 and the lower end-plug 12a are joined to each other. Further, the stress concentration itself is relaxed because the depression of the concave portion 12f of a curved surface shape of the lower end-plug 12a has a shape approximated to a portion of a spherical surface.

In case of cracking occurring at the uppermost portion of the interface between the metallic joint material 20 and the outer periphery surface of the connection 21 as above, a crack that propagates under a repeated stress due to the internal-external pressure difference across the nuclear fuel rod 10a propagates to the interface between the butt joint interface 12d and the metallic joint material 20, and does not penetrate the outer periphery surface of the nuclear fuel rod 10a because the butt joint interface 11a of the fuel cladding tube 11 and the butt joint interface 12d of the lower end-plug 12a are both slanted upward from the inner periphery surface side to the outer periphery surface side. Upon reaching the end portion on the inner periphery side of the butt joint interface 12d of the lower end-plug 12a, a crack that has propagated through the interface between the metallic joint material 20 and the outer periphery surface of the connection 21 propagates along the inner surface of the concave portion 12f of a curved surface shape of the lower end-plug 12a below, and the outer surface of the connection 21, and stays inside the nuclear fuel rod 10a.

Here, any crack propagation into the connection 21 does not pose a problem because the crack does not penetrate the nuclear fuel rod 10a.

Preferably, a silicon carbide (SiC) material is used for the fuel cladding tube 11, the lower end-plug 12a, and the connection 21. It is particularly preferable that the fuel cladding tube 11 and the lower end-plug 12a use a silicon carbide fiber reinforced silicon carbide composite material containing silicon carbide fibers in a silicon carbide matrix (hereinafter, also referred to as "SiC/SiC composite material"). Preferably, the SiC/SiC composite material used has a SiC layer formed on a part of the surface (for example, in a region corresponding to the joint surface). The method used to form the SiC layer is not particularly limited, and methods, for example, such as a chemical vapor deposition method (CVD method), and a coating and sintering method may be used.

In order to shield the SiC itself from the coolant water environment inside the nuclear reactor, it is preferable to coat the fuel cladding tube 11 and the lower end-plug 12a with a Zr-, Ti-, or Cr-based alloy or compound of a thickness of about at most 100 μm. The method used to form such an environmental barrier coating is not particularly limited, and methods, for example, such as a physical vapor deposition method (PVD method), a chemical vapor deposition method (CVD method), and a coating and sintering method may be used.

Preferably, the fuel cladding tube 11 has the same dimensions as traditional fuel cladding tubes of a zirconium alloy. For example, the fuel cladding tube 11 has a length of about 4 m, an outer diameter of about 11 mm, and a thickness of about 1 mm. Preferably, the lower end-plug 12a has such a shape or dimensions that no step is created on the outer surface in the vicinity of the joint made upon joining the butt joint interface 12d to the butt joint interface 11a of the fuel cladding tube 11. In order to aid insertion of the connection 21 to the fuel cladding tube 11 and to the concave portion 12f of a curved surface shape of the lower end-plug 12a, the outer diameter of the connection 21 is preferably smaller than the inner diameter of the fuel cladding tube 11 by a moderate amount of clearance (for example, about 0.02 to 0.5 mm).

As illustrated in FIG. 4, the fuel cladding tube 11 and the lower end-plug 12a are supported via the connection 21, and are joined air-tight to each other by brazing and/or diffusion joining via the metallic joint material 20. The metallic joint material 20 may be preferably one selected from Si (melting point: 1,414° C.), Ti (melting point: 1,812° C.), Zr (melting point: 1,855° C.), and a Si alloy, a Ti alloy, and a Zr alloy of a composition with a solidus temperature of 1,200° C. or more. By forming a joint with the metallic joint material 20 having a melting temperature (a temperature at which a liquid phase occurs) of 1,200° C. or more, the nuclear fuel rod 10a can remain air-tight even in a rare case where the nuclear fuel rod 10a reaches a temperature as high as 1,200° C.

Because the fuel cladding tube 11 and the lower end-plug 12a are joined to each other via the metallic joint material 20 in the present embodiment, it is not always possible to fully distinguish between "brazing" and "diffusion joining" on the basis of microstructure. Accordingly, the terms "brazing" and/or "diffusion joining" are used herein on the condition that the heating and joining involves the metallic joint material 20.

The following describes a method for joining the fuel cladding tube 11 and the lower end-plug 12a to each other.

First, for example, a coating of the metallic joint material 20 is formed on at least one of the butt joint interface 11a of the fuel cladding tube 11 and the butt joint interface 12d of the lower end-plug 12a that are to be joined to each other, and on at least one of the inner periphery surface of the fuel cladding tube 11 and the outer periphery surface of the connection 21. Preferably, the coating thickness is thick enough to close the clearance (the gap between the inner diameter of the fuel cladding tube 11 and the outer diameter of the connection 21) (for example, a thickness of about 0.01 to 0.25 mm). In this way, the lower end-plug 12a can be prevented from becoming loose or falling off when the butt joint interface 11a of the fuel cladding tube 11 is brought into contact with the butt joint interface 12d of the lower end-plug 12a, and when the connection 21 is inserted in the fuel cladding tube 11, and in the concave portion 12f of a curved surface shape of the lower end-plug 12a. The method used for the coating of the metallic joint material 20 is not particularly limited, and known methods, for example, such as vapor deposition, spraying, cold spraying, and melting may be used.

The fuel cladding tube 11 and the lower end-plug 12a are then heated while being pressed against each other to join the fuel cladding tube 11, the lower end-plug 12a, and the connection 21. Here, the fuel pellets 13 have not been charged into the fuel cladding tube 11, and the fuel cladding tube 11 on the side of the upper end-plug 12b has an open end.

The fuel pellets 13 are then charged into the fuel cladding tube 11, and, after the insertion of the retainer spring 15, the butt joint interface of the upper end-plug 12b is brought into contact with the butt joint interface of the fuel cladding tube 11. These are then joined to each other under heat. In joining the fuel cladding tube 11 and the lower end-plug 12a to each other without the fuel pellets 13, heat may be applied to the whole fuel cladding tube 11, including the joint with the lower end-plug 12a. In joining the upper end-plug 12b and the fuel cladding tube 11 to each other after the insertion of the fuel pellets 13 and the retainer spring 15, heat is applied locally to the joint so that the fuel pellets 13 are not heated. The heating method is not particularly limited, and known methods, for example, such as wide heating with a long heating furnace, and local heating with a laser, or a high-frequency or local heater may be used.

The metallic joint material 20 used in the present embodiment has an average linear coefficient of expansion of preferably less than 10 ppm/K. The thermal stress due to temperature fluctuations (thermal expansion and thermal shrinkage) of the nuclear fuel rod 10a can be minimized, and joint damage can be prevented when the material used as the metallic joint material 20 has an average linear coefficient of expansion that does not differ greatly from the average linear coefficient of expansion (4.3 to 6.6 ppm/K) of the SiC material to be joined by the metallic joint material 20. The effect may not be obtained when the metallic joint material 20 has an average linear coefficient of expansion of 10 ppm/K or more, and the long-term reliability of the nuclear fuel rod 10a as a whole may be lost in this case.

FIG. 5 is an enlarged schematic cross sectional view representing another example of the joint between the fuel cladding tube 11 and the lower end-plug 12a shown in FIG. 1. As illustrated in FIG. 5, a threaded structure 12e is provided on the inner periphery surface of the hollow cylindrical fuel cladding tube 11, the inner periphery surface of the cylindrical portion constituting the concave portion 12f of a curved surface shape of the lower end-plug 12a, and the outer periphery surface of the solid columnar portion of the connection 21. The reliability of the joint strength can be further improved by mechanically fastening the fuel cladding tube 11 and the lower end-plug 12a with the threaded structure 12e via the connection 21. Considering the thickness of the fuel cladding tube 11, the threaded structure 12e is preferably a wide threaded structure (for example, shallow thread depth, and a wide thread pitch). Such a wide threaded structure may be used as long as the connection 21 can remain screwed and attached to the fuel cladding tube 11 and the lower end-plug 12a under the frictional force between the screwed external thread and internal thread.

FIG. 6 shows a side view and an elevational view of the fuel cladding tube 11 shown in FIG. 1, along with an enlarged cross sectional view of the joint shape of the fuel cladding tube 11. FIG. 7 shows a side view and an elevational view of the lower end-plug 12a shown in FIG. 1, along with an enlarged cross sectional view of the joint shape of the lower end-plug 12a. FIG. 8 shows a side view and an elevational view of the connection 21 disposed in a joint region inside the fuel cladding tube 11 and the lower end-plug 12a shown in FIGS. 6 and 7.

As illustrated in FIG. 6, the butt joint interface 11a formed at the end portion of the hollow cylindrical fuel cladding tube 11 (the end portion on the left-hand side of the side view in FIG. 6) has a slanted surface that makes the outer diameter of the fuel cladding tube 11 smaller toward the tip, as shown in the enlarged cross sectional view. The butt joint interface 11a creates a slope angle θa with the inner periphery surface of the fuel cladding tube 11. Specifically, the butt joint interface 11a is slanted with a slope angle θa with respect to the axial direction of the fuel cladding tube 11.

As illustrated in FIG. 7, the butt joint interface 12d formed at the end portion of the cylindrical portion constituting the concave portion 12f of a curved surface shape of the lower end-plug 12a (the end portion on the right-hand side of the side view in FIG. 7) has a slanted surface that makes the inner diameter of the cylindrical portion constituting the concave portion 12f of a curved surface shape larger toward the tip, as shown in the enlarged cross sectional view. The butt joint interface 12d creates a slope angle θb with the inner periphery surface of the cylindrical portion constituting the concave portion 12f of a curved surface shape. Specifically, the butt joint interface 12d is slanted with a slope angle θb with respect to the axial direction of the lower end-plug 12a. The slope angles θa and θb are the same, and allow contact between the butt joint interface 11a of the fuel cladding tube 11 and the butt joint interface 12d of the lower end-plug 12a.

The alignment accuracy between the fuel cladding tube 11 and the lower end-plug 12a can improve with the slope angle θa provided at the butt joint interface 11a of the fuel cladding tube 11, and the slope angle θb provided at the butt joint interface 12d of the lower end-plug 12a. This also increases the joint area between the butt joint interface 11a and the butt joint interface 12d, and can improve the joint strength and air-tightness.

Because the butt joint interface 11a of the fuel cladding tube 11 and the butt interface 12d of the lower end-plug 12a are slanted with the slope angles θa and θb, respectively, a crack that propagates under the repeated stress caused by the internal-external pressure difference across the nuclear fuel rod 10a in the manner described above does not penetrate the nuclear fuel rod 10a.

In order to obtain these effects, the slope angles θa and θb are preferably 30 to 800, desirably 45 to 600. The alignment accuracy improving effect can be obtained with slope angles θa and θb larger than 800. However, these angles are not sufficient to reduce crack propagation to the butt joint interface 12d. Processibility suffers, and chipping tends to occur at the tips of the butt joint interfaces 11a and 12d when the slope angles θa and θb are less than 30°.

Referring back to FIG. 7, the lower end-plug 12a has an outer diameter constriction 12g in a region that interdigitates with the lower tie plate of a fuel assembly (not illustrated), at a predetermined distance to the left along the lengthwise direction from the right dashed-dotted line of the side view. The outer diameter constriction 12g has such a shape that makes the outer diameter gradually smaller toward the tip of the lower end-plug 12a (toward the end portion on the left-hand side of the side view in FIG. 7). Specifically, the outer diameter constriction 12g is gradually sloped. The connection 21 is configured from a columnar portion, and a curved surface portion 21a approximated to a portion of a spherical surface, as shown in the side view of FIG. 8.

FIG. 9 is a partial schematic cross sectional view of a nuclear fuel rod according to another embodiment of the present invention. As illustrated in FIG. 9, the nuclear fuel rod 10b according to the present embodiment differs from the nuclear fuel rod 10a shown in FIG. 1 in that a joint covering 14 of a coating metal having high corrosion resistance is provided over the outer periphery surface including the joint between the lower end-plug 12a and the fuel cladding tube 11, and the outer periphery surface including the joint between the upper end-plug 12b and the fuel cladding tube 11.

FIG. 10 is an enlarged schematic cross sectional view representing an example of the joint between the fuel cladding tube 11 and the lower end-plug 12a shown in FIG. 9. FIG. 11 is an enlarged schematic cross sectional view representing an example of the joint between the fuel cladding tube 11 and the lower end-plug 12a shown in FIG. 9.

As illustrated in FIG. 10, the joint covering 14 covers the butt joint interface 11a of the fuel cladding tube 11, and the butt joint interface 12d of the lower end-plug 12a. The lower end of the joint covering 14 is below the depression constituting the concave portion 12f of a curved surface shape of the lower end-plug 12a. The upper end of the joint covering 14 is above the upper end portion of the connection 21 disposed in the fuel cladding tube 11 and in the concave portion 12f of a curved surface shape of the lower end-plug 12a. The joint covering 14 shown in FIG. 11 also covers the butt joint interface 11a of the fuel cladding tube 11 and the butt joint interface 12d of the lower end-plug 12a, and has a lower end below the depression constituting the concave portion 12f of a curved surface shape of the lower end-plug 12a, and an upper end above the upper end portion of the connection 21 disposed in the fuel cladding tube 11 and in the concave portion 12f of a curved surface shape of the lower end-plug 12a. As described above, the nuclear fuel rod 10b of the present embodiment has the joint covering 14 having high corrosion resistance covering the outer periphery surface including the joint between the lower end-plug 12a and the fuel cladding tube 11, and the outer periphery surface including the joint between the upper end-plug 12b and the fuel cladding tube 11. This further improves the joint strength compared to the nuclear fuel rods 10a shown in FIGS. 1, 4, and 5.

Fuel Assembly

FIG. 12 is a schematic longitudinal sectional view of a fuel assembly according to an embodiment of the present invention. FIG. 13 is a cross sectional view of the fuel assembly of FIG. 12 at A-A.

The fuel assembly 30 shown in FIGS. 12 and 13 is an example of a fuel assembly for boiling-water reactors (BWR), and includes an upper tie plate 31, a lower tie plate 32, a plurality of nuclear fuel rods 10 held to the upper tie plate 31 and the lower tie plate 32 at the both ends, water rods 33 (also referred to as water channels), a fuel support grid (spacer) 34 binding the nuclear fuel rods, and a channel box 35 attached to the upper tie plate 31 and surrounding the fuel rods bundled by the fuel support grid 34. A handle 37 is fastened to the upper tie plate 31, so that the whole fuel assembly 30 can be pulled up by lifting the handle 37. Some of the nuclear fuel rods are short part-length rods 36 of a height that does not reach the upper tie plate 31. Specifically, the short part-length rods 36 are nuclear fuel rods of a height that does not reach the upper tie plate 31, with a shorter effective fuel length than the nuclear fuel rods 10 (also called long part-length rods) inside the assembly.

As illustrated in FIG. 13, the nuclear fuel rods 10 (long part-length rods), the short part-length rods 36, and the water rods 33 are bundled in a square grid pattern, and housed inside the channel box 35 having a square-shaped transverse section. In this example, two water rods 33 are disposed at substantially the center of a transverse section of the channel box 35, and each water rod 33 is disposed in a grid region that can accommodate four nuclear fuel rods 10 (long part-length rods).

The water rods 33 in the fuel assembly 30 may be zirconium alloy water rods. However, considering a rare but possible incidence of loss-of-coolant accident (LOCA), it is preferable that the water rods 33 have the same configuration as the nuclear fuel rods 10, specifically a configuration with a hollow tube and end plugs made of a SiC material, and in which the hollow tube and the end plugs are joined to each other via the metallic joint material 20. The water rods 33 also may have a configuration in which the joint covering 14 covers the joint area where the hollow tube and the end plugs are joined to each other via the metallic joint material 20.

In order to shield the SiC itself from the coolant water environment inside the nuclear reactor, it is preferable to cover the water contacting surfaces of the water rods 33 and the channel box 35 with a Zr-, Ti-, or Cr-based alloy or compound of a thickness of about at most 100 μm, in addition to the nuclear fuel rods 10 and the short part-length rods 36. The method used to form the environmental barrier coating is not particularly limited, and methods, for example, such as a physical vapor deposition method (PVD method), a chemical vapor deposition method (CVD method), and a coating and sintering method may be used. For improved adhesion between the environmental barrier coating and the SiC base material, it is preferable to reduce the thermal expansion difference by controlling the chemical composition or the proportion of the constituent phase.

FIG. 14 is a schematic transverse sectional view representing an example of a boiling-water reactor cell. As illustrated in FIG. 14, a cell 40 of a boiling-water reactor (BWR) has four fuel assemblies 30 that are disposed in a square pattern, and control rods 41 that are arranged in a substantially crossed pattern at the center in a transverse section. With the nuclear fuel rods 10 and the fuel assemblies 30 of the present embodiment, the cell 40 can have improved safety against emergency situations (for example, a loss-of-coolant accident) while maintaining the current level of long-term reliability under a normal operating environment.

FIG. 15 is a partially transparent external perspective view of a fuel assembly loaded into a pressurized-water reactor. As illustrated in FIG. 15, the fuel assembly 50 is an example of a fuel assembly for pressurized-water reactors (PWR), and includes a plurality of nuclear fuel rods 10, a plurality of control rod guide thimbles 51, an incore instrumentation guide thimble 52, a plurality of support grids (spacers) 53 that bundles and supports these components, an upper nozzle 54, and a lower nozzle 55. The upper nozzle 54 and the lower nozzle 55 are provided as frame members of the fuel assembly 50, and to locate the fuel assembly 50 in the reactor core, or to provide channels for coolant water. The incore instrumentation guide thimble 52 is provided to guide incore instrumentation devices, such as a local power range monitor (LPRM), and an average power range monitor (APRM), to the reactor core.

FIG. 16 is a schematic transverse sectional view representing an example of a pressurized-water reactor cell. As illustrated in FIG. 16, four fuel assemblies 50 are directly disposed in a square pattern in the pressurized-water reactor (PWR) cell 60 because the fuel assemblies 50 have control rods therein. With the nuclear fuel rods 10 and the fuel assemblies 50 according to the present embodiment, the cell 60 also can have improved safety against emergency situations (for example, a loss-of-coolant accident) while maintaining the current level of long-term reliability under a normal operating environment.

The foregoing embodiments described the nuclear fuel rods (10, 10a, and 10b) in which silicon carbide (SiC) is used as a constituent material of the fuel cladding tube 11, the lower end-plug 12a, the upper end-plug 12b, and the connection 21. However, the present invention is not limited to these embodiments. For example, the present invention is also applicable to a hollow tubular body (cladding tube) configured from common oxide ceramic materials such as alumina ($Al_2O_3$), zirconia ($ZrO_2$), and mullite ($Al_6O_{13}Si_2$) and having lids made of such materials, and that is sealed against high temperature and/or high pressure, and exposed to a corrosive environment.

EXAMPLES

The following describes the present invention in greater detail as Examples. It is to be noted that the present invention is not limited by the following Examples.
Experiment for Joining SiC Material with Metallic Joint Material A plurality of metallic joint materials 20 was prepared, and experiments were conducted by joining a SiC mock fuel cladding tube and a SiC mock end plug. The SiC mock fuel cladding tube and the SiC mock end plug were used after forming a SiC layer on the surfaces. Table 1 shows details of the metallic joint materials prepared.

TABLE 1

Details of metal joint materials

| | Heating temperature in electric furnace | Material | Composition (mass %) | Solidus temperature (° C.) | Average linear coefficient of expansion (ppm/K) |
|---|---|---|---|---|---|
| Joint material | | SiC | | 2,730 | 4.3 to 6.6 |
| Ex. 1 | 1,450 to 1,514° C. | Si | C: 0.08% or less, Si: bal. | 1,404 to 1,414 | 3.3 |
| Ex. 2 | 1,250 to 1,514° C. | Si alloy | Ge: 50% or less, C: 0.08% or less, Si: bal. | 1,200 to 1,414 | 3.5 to 5.0 |
| Ex. 3 | | | Mo: 5% or less, W: 20% or less, Fe: 40% or less, Si: bal. | 1,207 to 1,414 | 3.5 to 4.0 |
| Ex. 4 | 1,450 to 1,514° C. | | Ti: 2% or less, Zr: 2% or less, Ta: 2% or less, Nb: 2% or less, V: 2% or less, Y: 2% or less, Cr: 2% or less, Si: bal. | 1,242 to 1,414 | 3.5 to 4.0 |
| Ex. 5 | 1,200 to 1,400° C. | Ti | Fe: 0.3% or less, C: 0.08% or less, Ti: bal. | 1,635 to 1,656 | 8.6 |
| Ex. 6 | | Ti alloy | Zr: 50%, Fe: 0.3% or less, C: 0.08% or less, Ti: bal. | 1,480 to 1,553 | 7.5 |
| Ex. 7 | | Zr | Fe: 0.3% or less, C: 0.08% or less, Zr: bal. | 1,740 to 1,855 | 5.7 |
| Ex. 8 | | Zr alloy | Sn: 1.2 to 1.7%, Ni: 0.03 to 0.08%, Fe: 0.07 to 0.2%, Cr: 0.05 to 0.15%, Ti: 0.005% or less, Zr: bal. | 1,643 to 1,744 | 6.5 |
| Ex. 9 | | | Sn: 1.2 to 1.7%, Fe: 0.18 to 0.24%, Cr: 0.07 to 0.13%, Ti: 0.005% or less, Zr: bal. | 1,656 to 1,706 | 6.5 |
| Ex. 10 | | | Nb: 1 to 2.5%, Ti: 0.005% or less, Zr: bal. | 1,811 to 1,853 | 6.5 |

As shown in Table 1, the metallic joint material used in Example 1 contained 0.08% or less C, and the balance Si.

The metallic joint material used in Example 2 contained 50% or less Ge, 0.08% or less C, and the balance Si.

The metallic joint material used in Example 3 contained 5% or less Mo, 20% or less W, 40% or less Fe, and the balance Si.

The metallic joint material used in Example 4 contained 2% or less Ti, 2% or less Zr, 2% or less Ta, 2% or less Nb, 2% or less V, 2% or less Y, 2% or less Cr, and the balance Si.

The metallic joint material used in Example 5 contained 0.3% or less Fe, 0.08% or less C, and the balance Ti.

The metallic joint material used in Example 6 contained 50% Zr, 0.3% or less Fe, 0.08% or less C, and the balance Ti.

The metallic joint material used in Example 7 contained 0.3% or less Fe, 0.08% or less C, and the balance Zr.

The metallic material used in Example 8 contained 1.2 to 1.7% Sn, 0.03 to 0.08% Ni, 0.07 to 0.2% Fe, 0.05 to 0.15% Cr, 0.005% or less Ti, and the balance Zr.

The metallic joint material used in Example 9 contained 1.2 to 1.7% Sn, 0.18 to 0.24% Fe, 0.07 to 0.13% Cr, 0.005 or less Ti, and the balance Zr.

The metallic joint material used in Example 10 contained 1 to 2.5% Nb, 0.005% or less Ti, and the balance Zr.

A SiC mock fuel cladding tube, and a SiC mock end plug were prepared that had a SiC layer formed on the surface, and the metallic joint material (thickness of about 0.2 mm) of each Example was deposited on the SiC mock fuel cladding tube and the SiC mock end plug on one of the surfaces, using a vapor deposition method. The SiC mock fuel cladding tube, and the SiC mock end plug were then butted (contacted) to each other with the deposited metallic joint material coatings facing each other, and subjected to a compression heat treatment (under a stream of argon) with an electric furnace. The heating temperature was 1,450 to 1,514° C. in Examples 1 and 4, 1,250 to 1,514° C. in Examples 2 and 3, and 1,200 to 1,400° C. in Examples 5 to 10. After forming a joint under heat, a joint cross section was polished, and the microstructure of the joint region was observed under a light microscope.

Observations of the microstructure in the joint region found that Examples 1 to 4 (Si, and a Si alloy) had microstructures primarily from brazing (braze structure), and that Examples 5 to 10 (Ti, a Ti alloy, Zr, and a Zr alloy) had microstructures primarily from diffusion joining (diffusion joint structure). Cracks or communicating gas pockets were not observed in the joint region in any of the Examples.

The specific descriptions of the foregoing embodiments are intended to help understand the present invention, and the present invention is not limited to having all the configurations described above. For example, a part of the configuration of a certain embodiment may be replaced with the configuration of some other embodiment, or the configuration of a certain embodiment may be added to the configuration of some other embodiment. It is also possible to delete a part of the configuration of any of the embodiments, or replace a part of the configuration with other configuration, or add other configurations.

REFERENCE SIGNS LIST 10, 10a, and 10b: Nuclear fuel rod
11: Fuel cladding tube
11a: Butt joint interface
12a: Lower end-plug
12b: Upper end-plug
12c: Straight barrel insert
12d: Butt joint interface
12e: Threaded structure
12f: Concave portion of a curved surface shape
12g: Outer diameter constriction
13: Fuel pellet
14: Joint covering
15: Retainer spring
20: Metallic joint material
21: Connection
21a: Curved surface portion
30: Fuel assembly
31: Upper tie plate
32: Lower tie plate
33: Water rod
34: Fuel support grid (spacer)
35: Channel box
36: Short part-length rod
37: Handle
40: Cell
41: Control rod
50: Fuel assembly
51: Control rod guide thimble
52: Incore instrumentation guide thimble
53: Support grid
54: Upper nozzle
55: Lower nozzle
60: Cell

The invention claimed is:

1. A fuel rod for light water reactors, comprising:
a cylindrical cladding tube formed of a ceramic base material primarily containing SiC, $Al_2O_3$, $ZrO_2$, or $Al_6O_{13}Si_2$;
a connection formed of the same material as the cladding tube; and
an end plug having a concave portion of a continuously curved surface shape adapted to house the connection,
wherein the end plug is formed of the same material as the cladding tube,
wherein a slanted surface formed at an end portion of the cladding tube, and a slanted surface formed at an end portion of the end plug are joined in contact with each other with a metallic joint material at a joint, and
wherein the joint is supported by the connection.

2. The fuel rod for light water reactors according to claim 1,
wherein the connection includes a columnar portion, and a curved surface portion that is provided at one end or both ends of the lengthwise direction of the columnar portion, and that is approximated to a portion of a spherical surface, and
wherein the columnar portion and the curved surface portion have outer surfaces that are continuous to each other.

3. The fuel rod for light water reactors according to claim 2,
wherein the concave portion of a curved surface shape of the end plug has a cylindrical portion opposite the columnar portion of the connection with a predetermined gap in between, and a depression approximated to a portion of a spherical surface, and
wherein the cylindrical portion and the depression have inner surfaces that are continuous to each other.

4. The fuel rod for light water reactors according to claim 3, wherein the slanted surface formed at the end portion of the end plug has a shape that makes the inner diameter of the concave portion of a curved surface shape larger toward the cladding tube.

5. The fuel rod for light water reactors according to claim 4, wherein the slanted surface formed at the end portion of the cladding tube is slanted toward the end plug from the outer periphery side to the inner periphery side of the cladding tube so as to contact the slanted surface formed at the end portion of the end plug.

6. The fuel rod for light water reactors according to claim 5, wherein the metallic joint material joins at least the slanted surface of the cladding tube and the slanted surface of the end plug to each other, and the inner periphery surface of the cladding tube and the outer periphery surface of the connection to each another.

7. The fuel rod for light water reactors according to claim 6, wherein the metallic joint material has an average coefficient of thermal expansion of less than 10 ppm/K, and is one selected from silicon, a silicon alloy, titanium, a titanium alloy, zirconium, and a zirconium alloy when the ceramic material is a silicon carbide material, and wherein the metallic joint material is joined by brazing or diffusion joining.

8. The fuel rod for light water reactors according to claim 7,
wherein the metallic joint material is deposited beforehand to the slanted surface of the cladding tube, and/or the slanted surface of the end plug, and to the inner periphery surface of the cladding tube, and/or the outer periphery surface of the columnar portion of the connection, and
wherein the joint portions with the deposited metallic joint material are butted against each other, and locally heated with a laser, or a high-frequency or local heater.

9. The fuel rod for light water reactors according to claim 8, wherein the slanted surface of the cladding tube has a slope angle of 30° or more and 80° or less on its plane with respect to the axial direction of the cladding tube.

10. A fuel assembly that comprises a plurality of fuel rods bundled with a spacer, and that is loadable into a reactor core of a nuclear reactor,
wherein the fuel rods include:
a cylindrical cladding tube formed of a ceramic base material primarily containing SiC, $Al_2O_3$, $ZrO_2$, or $Al_6O_{13}Si_2$;
a connection formed of the same material as the cladding tube; and
an end plug having a concave portion of a continuously curved surface shape adapted to house the connection,
the end plug being formed of the same material as the cladding tube,
a slanted surface formed at an end portion of the cladding tube, and a slanted surface formed at an end portion of the end plug being joined in contact with each other with a metallic joint material at a joint, and
the joint being supported by the connection.

11. The fuel assembly according to claim 10,
wherein the connection includes a columnar portion, and a curved surface portion that is provided at one end or both ends of the lengthwise direction of the columnar portion, and that is approximated to a portion of a spherical surface, and
wherein the columnar portion and the curved surface portion have outer surfaces that are continuous to each other.

12. The fuel assembly according to claim 11,
wherein the concave portion of a curved surface shape of the end plug has a cylindrical portion opposite the columnar portion of the connection with a predetermined gap in between, and a depression approximated to a portion of a spherical surface, and
wherein the cylindrical portion and the depression have inner surfaces that are continuous to each other.

13. The fuel assembly according to claim 12, wherein the slanted surface formed at the end portion of the end plug has a shape that makes the inner diameter of the concave portion of a curved surface shape larger toward the cladding tube.

14. The fuel assembly according to claim 13, wherein the slanted surface formed at the end portion of the cladding tube is slanted toward the end plug from the outer periphery side to the inner periphery side of the cladding tube so as to contact the slanted surface formed at the end portion of the end plug.

15. The fuel assembly according to claim 14, wherein the metallic joint material joins at least the slanted surface of the cladding tube and the slanted surface of the end plug to each other, and the inner periphery surface of the cladding tube and the outer periphery surface of the connection to each another.

16. The fuel assembly according to claim 15, wherein the metallic joint material has an average coefficient of thermal expansion of less than 10 ppm/K, and is one selected from silicon, a silicon alloy, titanium, a titanium alloy, zirconium, and a zirconium alloy when the ceramic material is a silicon carbide material, and wherein the metallic joint material is joined by brazing or diffusion joining.

17. The fuel assembly according to claim 16,
wherein the metallic joint material is deposited beforehand to the slanted surface of the cladding tube, and/or the slanted surface of the end plug, and to the inner periphery surface of the cladding tube, and/or the outer periphery surface of the columnar portion of the connection, and
wherein the joint portions with the deposited metallic joint material are butted against each other, and locally heated with a laser, or a high-frequency or local heater.

18. The fuel assembly according to claim 17, wherein the slanted surface of the cladding tube has a slope angle of 30° or more and 80° or less on its plane with respect to the axial direction of the cladding tube.

* * * * *